United States Patent
Feng

(10) Patent No.: US 12,242,735 B2
(45) Date of Patent: Mar. 4, 2025

(54) MEMORY SYSTEMS AND OPERATION METHODS THEREOF

(71) Applicant: Yangtze Memory Technologies Co., LTD., Hubei (CN)

(72) Inventor: Yufei Feng, Hubei (CN)

(73) Assignee: YANGTZE MEMORY TECHNOLOGIES CO., LTD., Hubei (CN)

( * ) Notice: Subject to any disclaimer, the term of this patent is extended or adjusted under 35 U.S.C. 154(b) by 0 days.

(21) Appl. No.: 18/323,995

(22) Filed: May 25, 2023

(65) Prior Publication Data

US 2024/0281147 A1    Aug. 22, 2024

(30) Foreign Application Priority Data

Feb. 16, 2023   (CN) .......................... 202310131742.7

(51) Int. Cl.
G06F 3/06    (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
USPC ........................................................ 711/103
See application file for complete search history.

(56) References Cited

U.S. PATENT DOCUMENTS

| | | | |
|---|---|---|---|
| 2004/0233714 A1* | 11/2004 | Morikawa | H01L 29/7923 257/E21.21 |
| 2016/0077749 A1* | 3/2016 | Ravimohan | G06F 3/064 711/103 |
| 2020/0226026 A1* | 7/2020 | Wu | G06F 3/0653 |
| 2023/0307018 A1* | 9/2023 | Kataoka | G11C 11/5642 |
| 2024/0086107 A1* | 3/2024 | Nayak | G06F 3/0659 |

* cited by examiner

*Primary Examiner* — Than Nguyen
(74) *Attorney, Agent, or Firm* — Hanley, Flight & Zimmerman, LLC

(57) ABSTRACT

Examples of the present disclosure provide a memory system and an operation method thereof. The memory system comprises: a memory device and a memory controller coupled to the memory device; wherein, the memory device comprises at least one memory die, and the memory die comprises a plurality of code blocks storing code data; the code data stored in the plurality of code blocks is identical; the memory die comprises a plurality of memory planes, and the plurality of code blocks are stored in different memory planes; the memory controller is configured to: read a portion of code data of each code block of at least a portion of code blocks simultaneously by using an async multi-plane independent reading operation, wherein the read portion of code data of each code block constitutes complete code data stored in one code block.

20 Claims, 10 Drawing Sheets

Reading a portion of code data of each code block of at least a portion of code blocks simultaneously by using an async multi-plane independent reading operation; wherein the read portion of code data of each code block constitutes complete code data stored in one code block ⎯ S601

MEMORY SYSTEMS AND OPERATION METHODS THEREOF

CROSS-REFERENCE TO RELATED APPLICATION

This application claims priority to and the benefit of Chinese Patent Application 202310131742.7, filed on Feb. 16, 2023, which is hereby incorporated by reference in its entirety.

TECHNICAL FIELD

Examples of the present disclosure relate to the field of semiconductor technology, and in particular, to memory systems and operation methods thereof.

BACKGROUND

Memory is a device used to save information in modern information technology. As a typical non-volatile semiconductor memory, NAND (Not-And) memory has become a mainstream product in the market due to its high storage density, controllable production cost, suitable programming and erasing speed and retention characteristics.

However, with increasing requirements for memory, there are still many problems with memory and its systems in performing read and write operations.

BRIEF DESCRIPTION OF THE DRAWINGS

FIG. 6 is a schematic flow diagram of operations of a memory system provided by an example of the present disclosure;

FIG. 7 is a schematic diagram of layout of code blocks in a memory device provided by an example of the present disclosure;

FIG. 12 is a schematic diagram of an async multi-plane independent reading operation provided by yet another example of the present disclosure.

DETAILED DESCRIPTION

Figure 1:
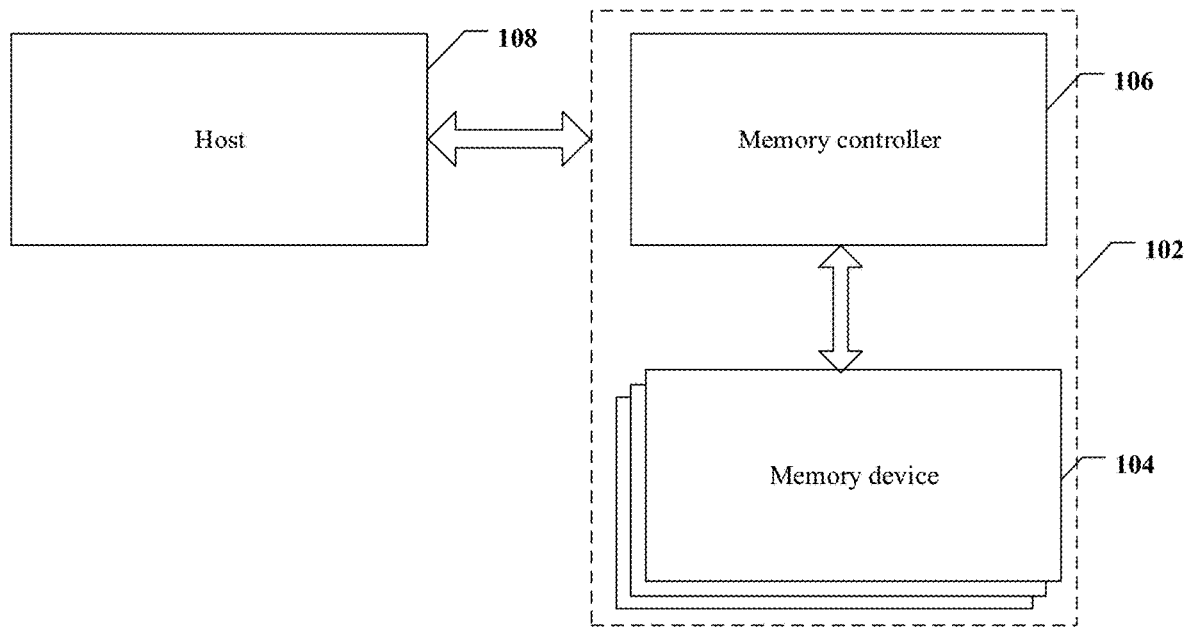
FIG. 1 is a schematic diagram of an example system with a memory system according to an example of the present disclosure.

Examples of the present disclosure are described in more detail below with reference to the accompanying drawings. Although examples of the present disclosure are shown in the drawings, it should be understood that the present disclosure may be implemented in various ways and should not be limited to the detailed description set forth herein. Rather, these examples are provided so that the present disclosure can be more thoroughly understood and the scope of the present disclosure can be fully conveyed to those having ordinary skill in the art.

In the following description, numerous specific details are given in order to provide a more thorough understanding of the present disclosure. It will be apparent, however, to one ordinarily skilled in the art that the present disclosure may be practiced without one or more of these details. In other examples, some technical features well-known in the art are not described to avoid confusion with the present disclosure; that is, not all features of the actual examples are described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on." "adjacent to," "connected to" or "coupled to" another element or layer, it can be directly on, adjacent to, connected to, or coupled to other elements or layers, or intervening elements or layers may be present. In contrast, when an element is referred to as being "directly on," "directly adjacent to," "directly connected to" or "directly coupled to" another element or layer, there are no intervening elements or layers. It will be understood that, although the terms such as first, second, third etc. may be used to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be represented as a second element, component, region, layer or section without departing from the teachings of the present disclosure. When a second element, component, region, layer or section is discussed, it does not indicate that a first element, component, region, layer or section necessarily exists in the present disclosure.

Spatial terms such as "under", "below", "beneath", "underneath", "on", "above" and so on, can be used here for convenience to describe the relationship between one element or feature and other elements or features shown in the figures. It will be understood that the spatially relationship terms also comprise different orientations of the device in use and operation in addition to the orientation depicted in the figures. For example, if the device in the figures is turned over, elements or features described as "below" or "underneath" or "under" other elements or features would then be oriented as "above" the other elements or features. Thus, the example terms "below" and "under" can comprise both orientations of above and below. The device may be otherwise oriented (rotated 90 degrees or at other orientations) and the spatial descriptors used herein may be interpreted accordingly.

The terminology used herein is for the purpose of describing particular examples only and is not to be taken as a limitation of the present disclosure. As used herein, "a", "an" and "said/the" in singular forms are intended to include the plural forms as well, unless the context clearly dictates otherwise. It should also be understood that the terms "consists of" and/or "comprising", when used in this specification, identify the presence of stated features, integers, steps, operations, elements and/or components, but do not exclude presence or addition of one or more other features, integers, steps, operations, elements, components and/or groups. As used herein, the term "and/or" includes any and all combinations of the associated listed items.

For ease of understanding the characteristics and technical content of the examples of the present disclosure in more detail, the implementation of the examples of the present disclosure will be described in detail below in conjunction with the accompanying drawings. The attached drawings are only for reference and description, and are not intended to limit the examples of the present disclosure.

The memory in the examples of the present disclosure includes but is not limited to a three-dimensional NAND memory, and for ease of understanding, a three-dimensional NAND memory is used as an example for illustration.

FIG. 1 illustrates a block diagram of an example system 100 having memory, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory 104 and a memory controller 106. Host 108 can be a processor of an electronic device, such as a central processing unit (CPU), or a system-on-chip (SoC), such as an application processor (AP). Host 108 can be configured to send or receive data to or from memory 104.

Memory controller 106 is coupled to memory 104 and host 108 and is configured to control memory 104, according to some implementations. Memory controller 106 can manage the data stored in memory 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid state disks (SSD) or embedded multi-media-cards (eMMCs) used as data storage for mobile devices, such as smartphones, tablets, laptop computers, etc., and enterprise storage arrays. Memory controller 106 can be configured to control operations of memory 104, such as read, erase, and program operations. Memory controller 106 can also be configured to manage various functions with respect to the data stored or to be stored in memory 104 including, but not limited to bad-block management, garbage collection, logical-to-physical address conversion, wear leveling, etc. In some implementations, memory controller 106 is further configured to process error correction codes (ECCs) with respect to the data read from or written to memory 104. Any other suitable functions may be performed by memory controller 106 as well, for example, formatting memory 104. Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
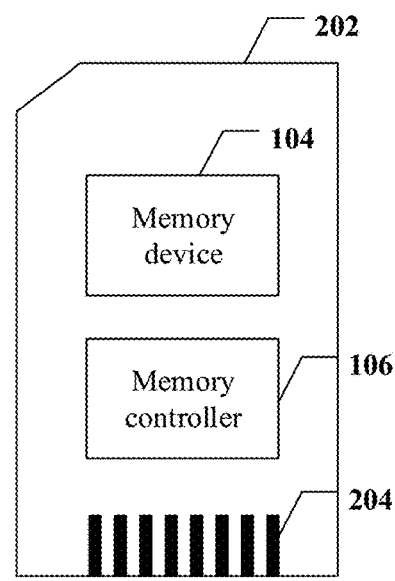
FIG. 2a is a schematic diagram of an example memory card with a memory system according to an example of the present disclosure.
Figure 2B:
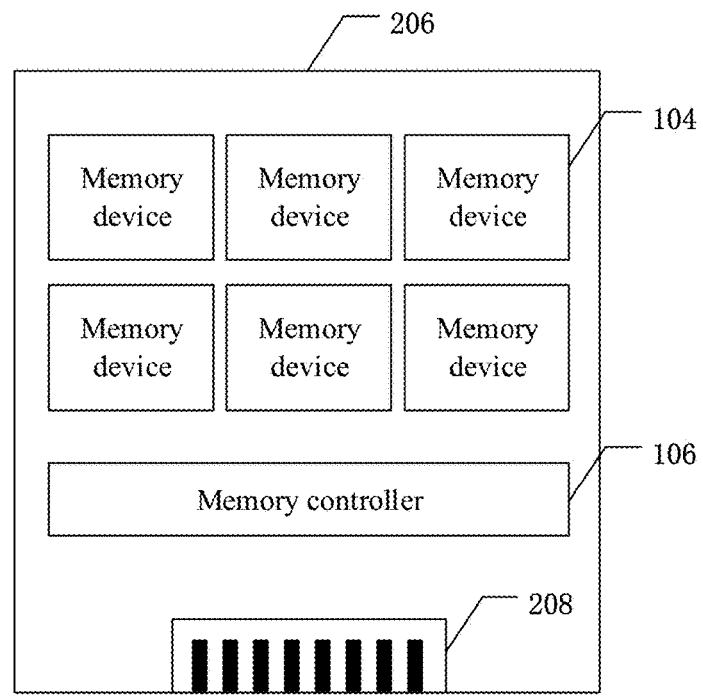
FIG. 2b is a schematic diagram of an example solid state drive with a memory system according to an example of the present disclosure.

Memory controller 106 and one or more memory 104 can be integrated into various types of storage devices, for example, be included in the same package, such as a universal Flash storage (UFS) package or an eMMC package. That is, memory system 102 can be implemented and packaged into different types of end electronic products. In one example as shown in FIG. 2a, memory controller 106 and a single memory 104 may be integrated into a memory card 202. Memory card 202 can include a PC card (PCM-CIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2b, memory controller 106 and multiple memory 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202.

Figure 3A:
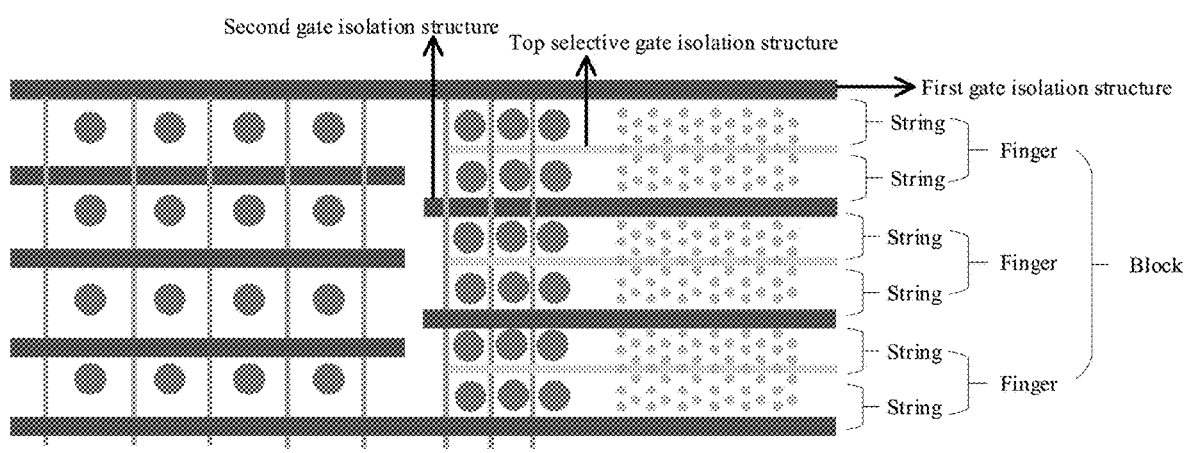
FIG. 3a is a schematic diagram of the distribution of memory cells of a three-dimensional NAND memory according to an example of the present disclosure.

FIG. 3a provides an example of a structural schematic diagram of a memory array of a three-dimensional NAND memory. As shown in FIG. 3a, the memory array of a three-dimensional NAND memory consists of several memory cell rows parallel to gate isolation structure and staggered in parallel. Every two rows of the memory cell rows are separated by a gate isolation structure and a top selective gate isolation structure, and each memory cell row includes a plurality of memory cells. The gate isolation structure may include a first gate isolation structure and a second gate isolation structure. The first gate isolation structure divides the memory array into a plurality of blocks, the plurality of second gate isolation structures can divide the blocks into multiple fingers, and the top selective gate isolation structure provided in the middle of each finger can divide the finger into two parts, so that the finger is divided into two strings. A block shown in FIG. 3a contains 6 strings, and in practical applications, the number of strings in a block is not limited to this.

In some examples, each block can be coupled to multiple word lines, and multiple memory cells coupled to each individually controlled word line form a page. By way of example, all memory cells in each string in FIG. 3a are coupled to form a page.

It should be noted that the number of memory cell rows between the gate isolation structure and the top selective gate isolation structure shown in FIG. 3a is merely an example, and is not used for limiting the number of memory cell rows contained in one finger of the three-dimensional NAND memory in the present disclosure. In practical applications, the number of memory cell rows contained in one finger can be adjusted according to actual conditions, such as 2, 4, 8, 16, and so on.

Figure 3B:
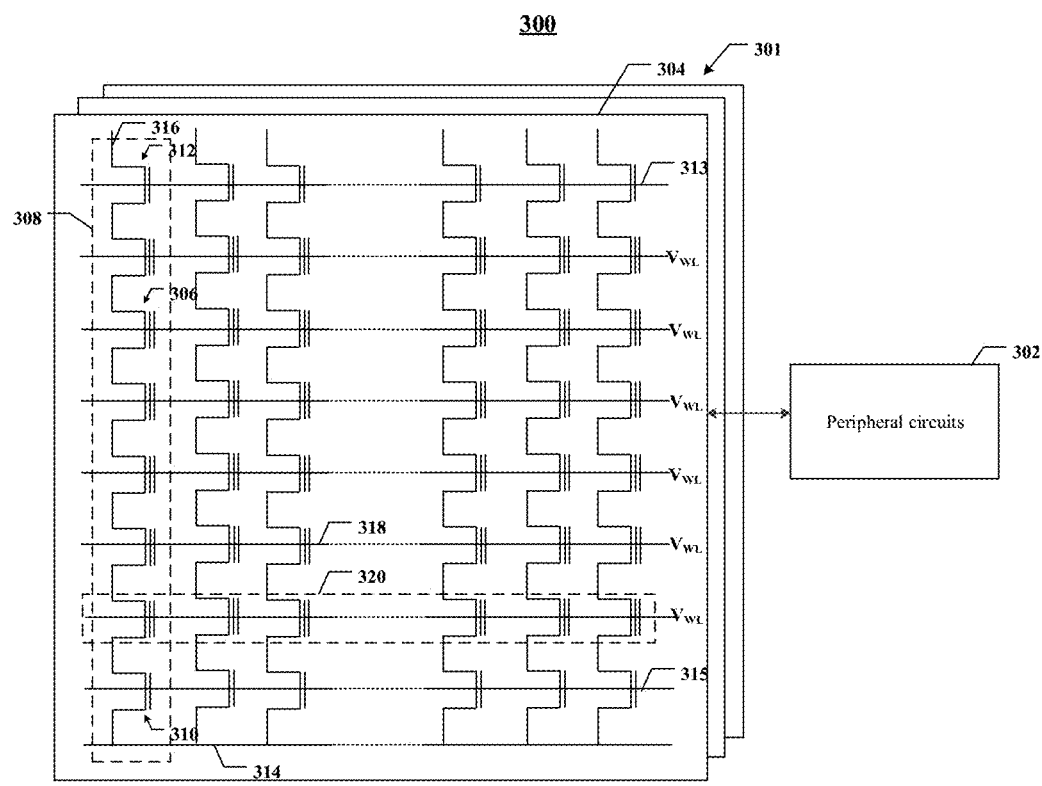
FIG. 3b is a schematic diagram of example memory including peripheral circuits according to an example of the present disclosure.

FIG. 3b illustrates a schematic circuit diagram of an example memory 300 including peripheral circuits, according to some aspects of the present disclosure. Memory 300 can be an example of memory 104 in FIG. 1. Memory 300 can include a memory array 301 and peripheral circuits 302 coupled to memory array 301. The memory array 301 is illustrated as an example of a three-dimensional NAND type memory array, in which memory cells 306 are provided in the form of an array of NAND memory strings 308 each extending vertically above a substrate (not shown). In some implementations, each NAND memory string 308 includes a plurality of memory cells 306 coupled in series and stacked vertically. Each memory cell 306 can hold a continuous, analog value, such as an electrical voltage or charge, that depends on the number of electrons trapped within a region of memory cell 306. Each memory cell 306 can be either a floating gate type of memory cell including a floating-gate transistor or a charge trap type of memory cell including a charge-trap transistor.

In some implementations, each memory cell 306 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 306 is a multi-level cell (MLC) that is capable of storing more than a single bit of data in more than four memory states. For example, the MLC can store two bits per cell, three bits per cell (also known as trinary-level cell (TLC)), four bits per cell (also known as a quad-level cell (QLC)), or five bits per cell (also known as a penta-level cell (PLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 3b, each NAND memory string 308 can include a bottom selective gate (BSG) 310 at its source end and a top selective gate (TSG) 312 at its drain end. BSG 310 and TSG 312 can be configured to activate selected NAND memory strings 308 during read and program operations. In some implementations, the sources of NAND memory strings 308 in a same block 304 are coupled through a same source line (SL) 314, e.g., a common SL. In other words, all NAND memory strings 308 in the same block 304 have an array common source (ACS), according to some implementations. TSG 312 of each NAND memory string 308 is coupled to a respective bit line 316 from which data can be read or written via an output bus (not shown), according to some implementations. In some implementations, each NAND memory string 308 is configured to be selected or deselected by applying a select voltage (e.g., above the threshold voltage of the transistor having TSG 312) or a deselect voltage (e.g., 0 V) to respective TSG 312 through one or more TSG lines 313 and/or by applying a select voltage (e.g., above the threshold voltage of the transistor having BSG 310) or a deselect voltage (e.g., 0 V) to respective BSG 310 through one or more BSG lines 315.

As shown in FIG. 3b, NAND memory strings 308 can be organized into multiple blocks 304, each of which can have a common source line 314, e.g., coupled to the ground. In some implementations, each block 304 is the basic data unit for erase operations, i.e., all memory cells 306 on the same block 304 are erased at the same time. To erase memory cells 306 in a selected block 304, source lines 314 coupled to selected block 304 as well as unselected blocks 304 in the same plane as selected block 304 can be biased with an erase voltage (Vers), such as a high positive voltage (e.g., 20 V or more). It is understood that in some examples, erase operation may be performed at a half-block level, a quarter-block level, or a level having any suitable number of blocks or any suitable fractions of a block. Memory cells 306 of adjacent NAND memory strings 308 can be coupled through word lines 318 that select which row of memory cells 306 is affected by read and program operations. In some implementations, each word line 318 is coupled to a page 320 of memory cells 306, and the page 320 is the basic data unit for program operations. The size of one page 320 in bits can relate to the number of NAND memory strings 308 coupled by word line 318 in one block 304. Each word line 318 can include a plurality of control gates (gate electrodes) at each memory cell 306 in respective page 320 and a gate line coupling the control gates. In combination with FIG. 3a above, one page 320 includes a plurality of memory cells 306, and the plurality of memory cells are isolated by the top selective gate isolation structure and the gate isolation structure. The multiple memory cells between the top selective gate isolation structure and the gate isolation structure are arranged into multiple memory cell rows, and each memory cell row is parallel to the gate isolation structure and the top selective gate isolation structure. Memory cells in strings that share a same word line form a programmable (write) page.

Figure 3C:
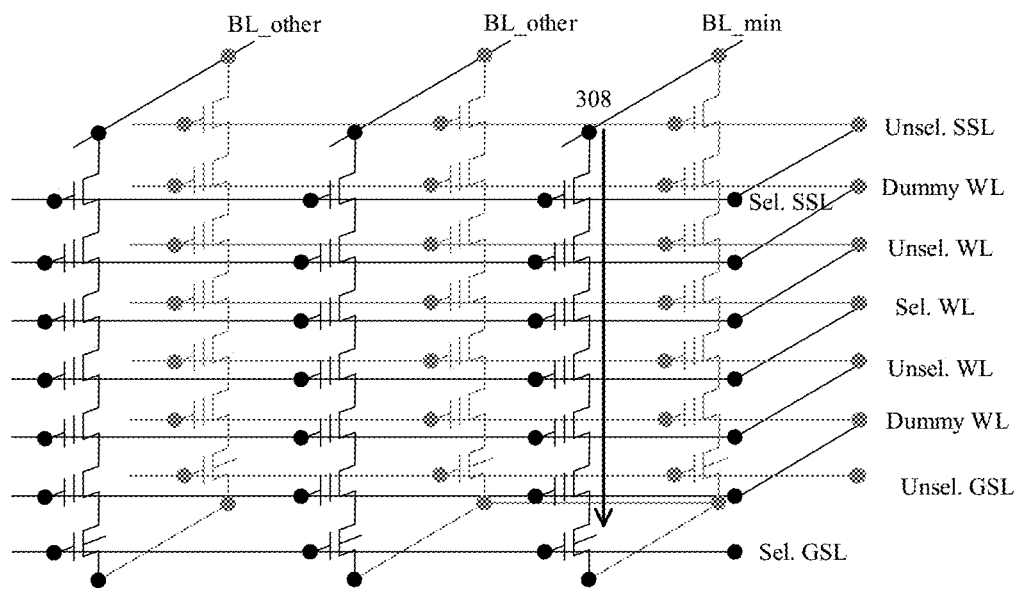
FIG. 3c is a schematic structural diagram of memory strings, word lines, and bit lines in the memory according to another example of the present disclosure.

Referring to FIG. 3a, FIG. 3b and FIG. 3c, each memory cell 306 of the plurality of memory cells is coupled to respective word line 318s, and each memory string 308 is coupled to respective bit lines 316 via a respective selective transistor (such as top selective transistor (TSG) 312).

Specifically, referring to FIG. 3c, the memory can include one or more memory strings 308 (refer to the arrows in FIG. 3c), and each memory string can include a top selective transistor SST corresponding to a top selective transistor gate line SSL, a ground selective transistor GST corresponding to a bottom selective transistor gate line GSL and a plurality of memory cells located between the top selective transistor and the ground selective transistor. Each memory string is connected to the respective bit lines BL and the unified common source line, respectively.

Here, referring to FIG. 3c, the word line coupled to the selected page is the selected word line (Sel.WL). The selected word line can be any word line of the multiple word lines in the memory, and other word lines are unselected word lines (Usel.WL) or Dummy Word Lines (Dummy WL). The bit lines BL in the memory are divided into two parts: a part of the bit lines is connected to memory cells that are in the lowest state (that is, the erased state) among the memory cells coupled to the selected word line, denoted as first bit lines (BL_min); and the other part of the bit lines is connected to memory cells other than memory cells that are in the lowest state (that is, the erased state) and have reached a target state among the memory cells coupled to the selected word line, denoted as second bit lines (BL_other). In actual operations, a certain target memory cell of the multiple memory cells can be selected by selecting corresponding word lines and bit lines for performing the corresponding read and program operations.

Figure 4:
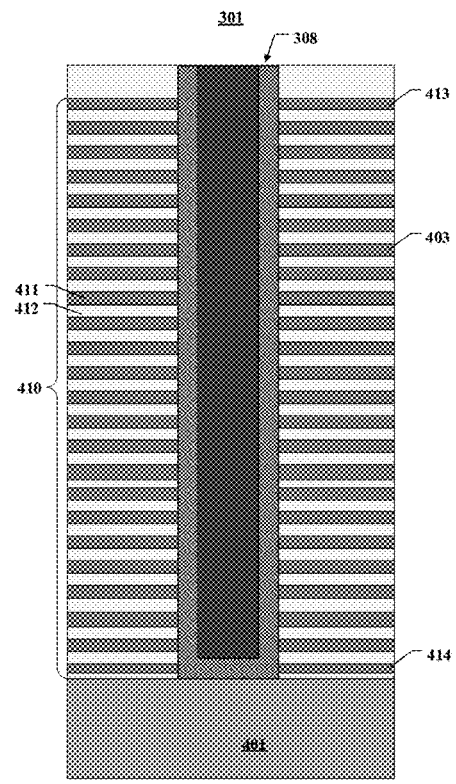
FIG. 4 is a schematic cross-sectional view of a memory array including NAND memory strings according to an example of the present disclosure.

FIG. 4 shows a schematic cross-sectional view of an example memory array 301 including NAND memory strings 308 in accordance with aspects of the present disclosure. As shown in FIG. 4, the NAND memory string 308 may include a stacked structure 410, which includes a plurality of gate layers 411 and a plurality of insulating layers 412 alternately stacked in sequence, and a memory string 308 vertically penetrating through the gate layers 411 and the insulating layers 412. The gate layer 411 and the insulating layer 412 can be stacked alternately, and two adjacent gate layers 411 are separated by an insulating layer 412. The number of pairs of gate layers 411 and insulating layers 412 in the stacked structure 410 can determine the number of memory cells included in the memory array 401.

The constituent material of the gate layer 411 may include a conductive material. The conductive material may include but is not limited to tungsten (W), cobalt (Co), Copper (Cu), aluminum (Al), polysilicon, doped silicon, silicide, or any combination thereof. In some implementations, each gate layer 411 may include a metal layer, e.g., a tungsten layer. In some implementations, each gate layer 411 includes a doped polysilicon layer. Each gate layer 411 may include a control gate surrounding the memory cell. The gate layer 411 at the top of the stacked structure 410 may extend laterally as a top selective gate line, the gate layer 411 at the bottom of the stacked structure 410 may extend laterally as a bottom selective gate line, and the gate layer 411 extending laterally between the top selective gate line and the bottom selective gate line may be used as a word line layer.

In some examples, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable material.

In some examples, NAND memory string 308 includes a channel structure extending vertically through the stacked structure 410. In some implementations, the channel structure includes a channel hole filled with semiconductor material(s) (e.g., as a semiconductor channel) and dielectric material(s) (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a blocking layer. The channel structure may have a cylindrical shape (e.g., a pillar shape). According to some implementations, the semiconductor channel, the tunneling layer, the storage layer and the blocking layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
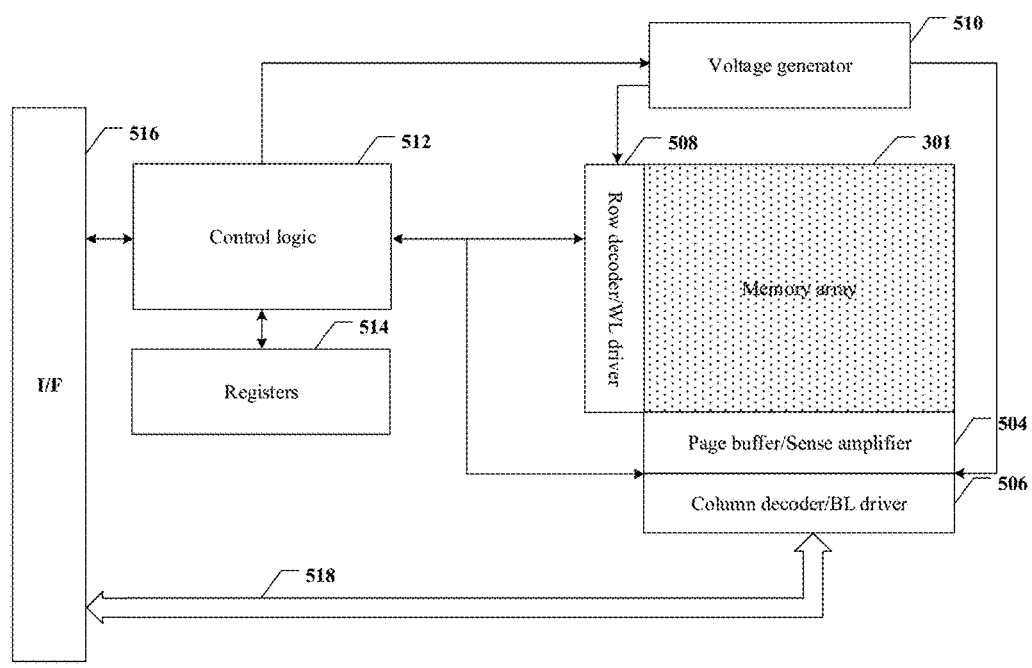
FIG. 5 is a schematic diagram of example memory including a memory cell array and peripheral circuits according to an example of the present disclosure.

Referring back to FIG. 3b, peripheral circuits 302 can be coupled to memory array 301 through bit lines 316, word lines 318, source lines 314, BSG lines 315, and TSG lines 313. Peripheral circuits 302 can include any suitable analog, digital, and mixed-signal circuits for facilitating the operations of memory array 301 by applying and sensing voltage signals and/or current signals to and from each target memory cell 306 through bit lines 316, word lines 318, source lines 314, BSG lines 315, and TSG lines 313. Peripheral circuits 302 can include various types of peripheral circuits formed using metal-oxide-semiconductor (MOS) technologies. For example, FIG. 5 illustrates some example peripheral circuits, the peripheral circuits 302 including a page buffer/sense amplifier 504, a column decoder/bit line driver 506, a row decoder/word line driver 508, a voltage generator 510, control logic 512, registers 514, an interface 516, and a data bus 518. It is understood that in some examples, additional peripheral circuits not shown in FIG. 5 may be included as well.

Page buffer/sense amplifier 504 can be configured to read and program (write) data from and to memory array 301 according to the control signals from control logic 512. In one example, page buffer/sense amplifier 504 may store one page of program data (write data) to be programmed into one page 320 of memory array 301. In another example, page buffer/sense amplifier 504 may perform program verify operations to ensure that the data has been properly programmed into memory cells 306 coupled to selected word lines 318. In still another example, page buffer/sense amplifier 504 may also sense the low power signals from bit line 316 that represents a data bit stored in memory cell 306 and amplify the small voltage swing to recognizable logic levels in a read operation. Column decoder/bit line driver 506 can be configured to be controlled by control logic 512 and select one or more NAND memory strings 308 by applying bit line voltages generated from voltage generator 510.

Row decoder/word line driver 508 can be configured to be controlled by control logic 512 and select/deselect blocks 304 of memory array 301 and select/deselect word lines 318 of block 304. Row decoder/word line driver 508 can be further configured to drive word lines 318 using word line voltages generated from voltage generator 510. In some implementations, row decoder/word line driver 508 can also select/deselect and drive BSG lines 315 and TSG lines 313 as well. As described below in detail, row decoder/word line driver 508 is configured to perform program operations on the memory cells 306 coupled to the selected word line(s) 318. Voltage generator 510 can be configured to be controlled by control logic 512 and generate the word line voltages (e.g., read voltage, program voltage, pass voltage, channel boost voltage, verification voltage, etc.), bit line voltages, and source line voltages to be supplied to memory array 301.

Control logic 512 can be coupled to each peripheral circuit described above and configured to control operations of each peripheral circuit. Registers 514 can be coupled to control logic 512 and include status registers, command registers, and address registers for storing status information, command operation codes (OP codes), and command addresses for controlling the operations of each peripheral circuit. Interface 516 may be coupled to control logic 512 and act as a control buffer to buffer and relay control commands received from a host (not shown) to control logic 512, and to buffer and relay status information received from control logic 512 to the host. Interface 516 may further be coupled to column decoder/bit line driver 506 via data bus 518 and act as a data I/O interface and data buffer to buffer and relay data to or from memory array 301.

It is to be understood that when the SSD is launched, it is necessary to load firmware to help other programs arrange a runnable environment, and the firmware code (consisting of multiple pages of code data) corresponding to the firmware is stored in a code block. To prevent the error in firmware code stored in the code block from affecting the launching and operation of the SSD, multiple code blocks, also known as code block copy, are usually provided to store the same firmware code as the original code block to ensure the normal launching and operation of the SSD. During the process of loading firmware (that is, after power-on or upon exiting low-power consumption mode), all blocks in the SSD are generally searched one by one for code block(s). Then, the firmware code in the code block is read to complete the loading of the firmware.

However, common firmware code occupy large storage capacity, usually occupying tens or even hundreds of pages. After finding the code block, reading can be performed sequentially from a beginning page of the code block to read the complete firmware code. Since the multiple code pages are read sequentially, the launching time is linearly related to the specification of the firmware code, that is, the larger the firmware code, the longer the loading time that SSD needs.

As an example, assuming that the number of pages occupied by the firmware code is Q. and the reading time for each page is tR, the total loading time T of the firmware code is: $T=A+(Q*R)$, where A is the hardware initialization time of the controller in SSD and the launching time of other hardware, and A is a fixed value here. In this way, the larger the firmware code, the longer the time for reading the firmware code, and the longer the time for launching the SSD or loading the firmware.

In view of this, in order to solve one or more of the above problems, another memory system and an operation method thereof is provided by an example of the present disclosure. The memory system includes: a memory device and a memory controller coupled to the memory device; wherein, the memory device comprises at least one memory die, and the memory die comprises a plurality of code blocks storing code data; the code data stored in the plurality of code blocks is identical; the memory die comprises a plurality of memory planes, and the plurality of code blocks are stored in different memory planes. With reference to FIG. 6, the operation method comprises the following:

S601: reading a portion of code data of each code block of at least a portion of code blocks simultaneously by using an async multi-plane independent reading operation, wherein the read portion of code data of each code block constitutes complete code data stored in one code block.

Specifically, the memory device may include a plurality of memory dice, each memory die may include a plurality of memory planes, each memory plane may include a plurality of blocks, at least one of the plurality of blocks is a code block, and each code block may include a plurality of code pages. Code data is stored in each code page, and all code data stored in each code block constitutes complete firmware code. Code data stored in code pages with the same number in the plurality of code blocks is identical. In addition, the blocks other than the code block in each memory plane include a plurality of pages, each of which can store respective data.

In some examples, a plurality of code blocks can be provided in each memory plane, or one code block can be provided in each memory plane. In the examples of the present disclosure, one code block is provided in each memory plane as an example for illustration. In other words, the plurality of code blocks are stored in different memory planes in the examples of the present disclosure, in which the firmware code stored in the plurality of code blocks is identical.

Figure 7:
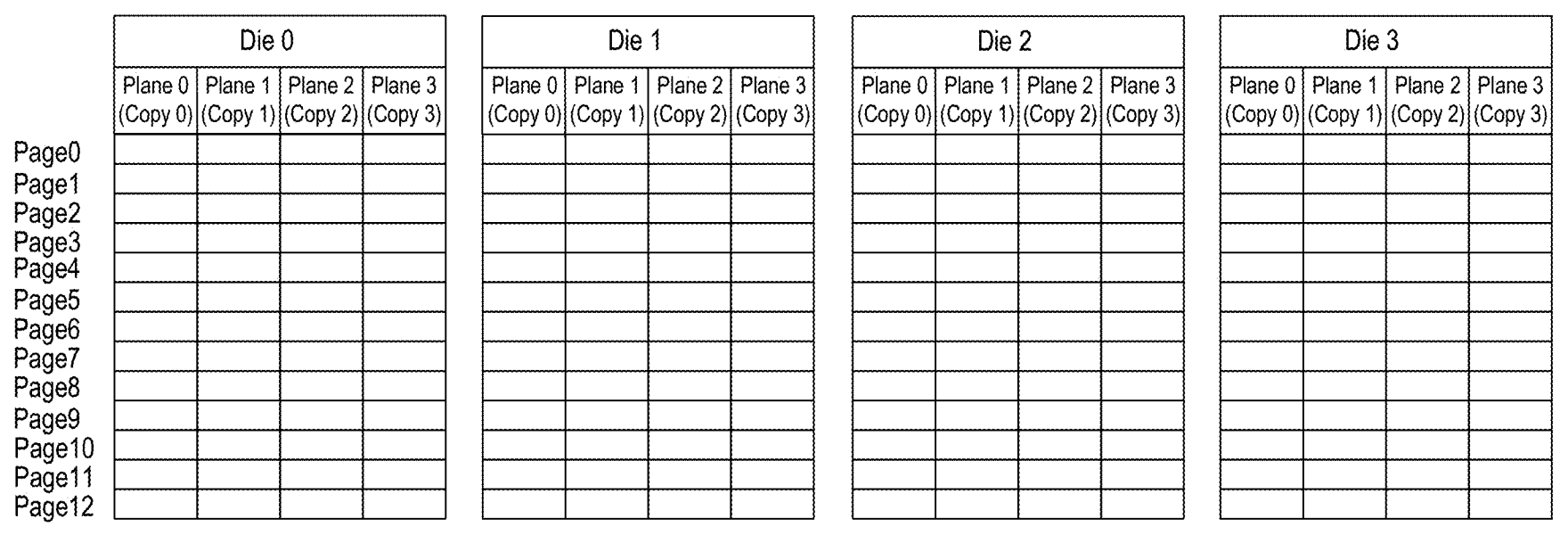

According to one example, FIG. 7 shows a schematic diagram of layout of a plurality of code blocks in a memory device. The memory device shown in FIG. 7 includes four memory dice, that is memory die 0 (Die0), memory die 1 (Die1), memory die 2 (Die2), and memory die 3 (Die3). Each memory die includes 4 memory planes, that is memory plane 0 (Plane0), memory plane 1 (Plane1), memory plane 2 (Plane2) and memory plane 3 (Plane3). Each memory plane includes a plurality of blocks (not shown in FIG. 7), and one of which is a code block (Copy). Based on this, 16 code blocks (Copy0-Copy 15) are included in the memory die shown in FIG. 7. Each code block can include a plurality of code pages (the smallest unit square shown in FIG. 7 is a code page), including 13 code pages (i.e., Page0-Page12) for example. The code data stored in the code pages with the same number in the plurality of code blocks is identical. For example, code data stored in Page0 of Copy0, Page0 of Copy1, . . . , Page0 of Copy15 is identical. In this way, when the reading of one of the plurality of code pages with the same number fails, replacement can be made and other code pages with the same number can be read to ensure that the code data corresponding to the numbered code page can be read correctly. In this way, the reliability of the read operation can be improved.

Before performing S601, the operating method further comprises: determining the plurality of the code blocks from the plurality of blocks of the memory die. As mentioned above, each memory plane includes a plurality of blocks, and one of the plurality of blocks is a code block. Before performing read operations on the plurality of memory planes, it is necessary to determine the address of the code blocks in each memory plane.

In some examples, each block is provided with a preset memory page, which may be the first page of each block (including the code block). A tag used to characterize the information of the code block is stored in the preset memory page of each code block. In other words, no corresponding tag is stored in the preset memory pages of other blocks except the code block. Based on this, determining the plurality of the code blocks from the plurality of blocks of the memory die may comprise: reading the preset memory pages of all the blocks in each of the memory planes of each of the memory die; and when the tag used to characterize the information of the code block is stored in a preset memory page of a first block, determining that the first block is the code block.

In one example, code data characterizing different information is stored in different code pages of the code block. A tag characterizing the information of the code block is stored in the preset memory page (such as the first page, generally Page0) of the code block. It is to be understood that the tag is an identification that can be used to identify the current block as a code block, and it can be determined which code pages in the code block store the code data based on the information set in the tag. In actual operations, the corresponding tag is not stored in the first page of other blocks in the memory plane. Therefore, by reading the first page of all blocks in the memory device, the information of the plurality of first pages read can be compared, and when a tag is stored in the first page of the first block, it can be determined that the first block is the code block.

It is noted that the preset memory page is the first page of the block herein. In other examples, the preset memory page can also be a memory page other than the first page in the block. In other words, when the preset memory page is a memory page other than the first page in the block, the address or position of the code block in the plurality of blocks can also be determined by reading the preset memory page (not the first page) in each block and making a comparison.

In some examples, read the preset memory pages of all the blocks in each of the memory planes of each of the memory die by using an async multi-plane independent reading operation.

It is noted that, in the process of reading by using an async multi-plane independent reading operation, a plurality of memory planes can be read simultaneously in one read operation, but for each memory plane, only one page in each plane can be read in one read operation. Therefore, when each plane includes a plurality of blocks, and each block includes one preset memory page (that is, each memory plane includes a plurality of preset memory pages), it is necessary to perform multiple read operations to obtain the preset memory pages of all the blocks in the plurality of memory planes. Compared with reading the preset memory pages in all blocks one by one in the related art, the async multi-plane independent reading operation used in the examples of the present disclosure can simultaneously read different pages of the plurality of different memory planes, thereby reducing the number of times of reading, saving reading time and improving reading performance.

Here, the async multi-plane independent reading operation can receive and process read commands in parallel without any address or timing constraints. For example, read commands can be directed to any address, for example, different addresses for different memory planes. The read commands can also be received at any time without any specific time sequence.

Figure 8:
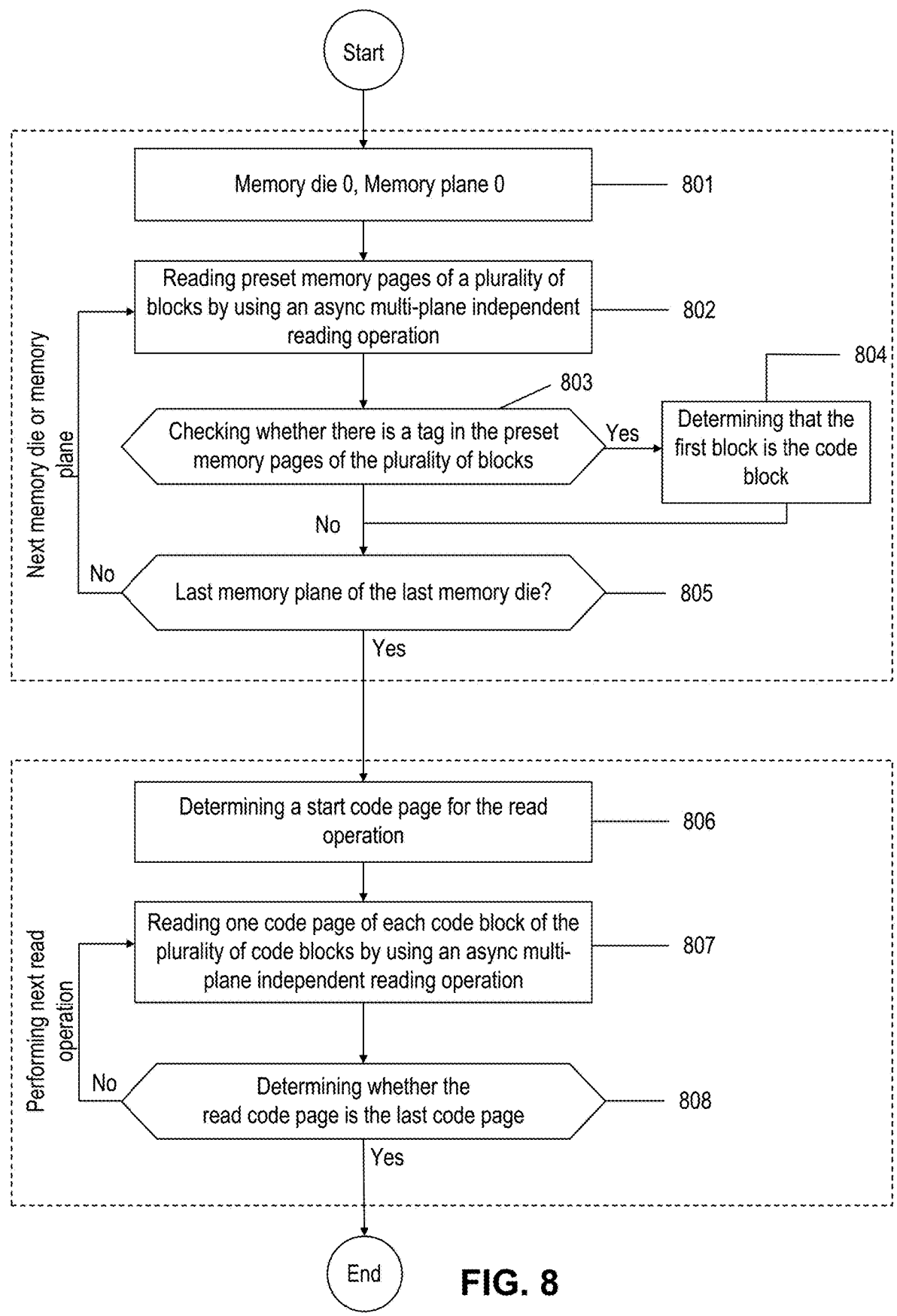
FIG. 8 is a schematic flow diagram for determining code blocks and reading code pages provided by an example of the present disclosure.
Figures 9, 10, 11:
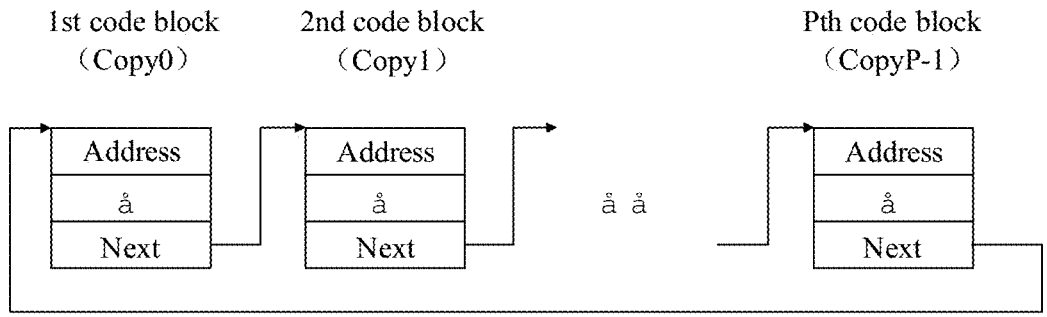
FIG. 9 is a portion of schematic flow diagram for determining a plurality of code blocks in FIG. 8.
FIG. 10 is a schematic diagram of an async multi-plane independent reading operation provided by an example of the present disclosure.
FIG. 11 is a schematic diagram of an async multi-plane independent reading operation provided by another example of the present disclosure.

The process of determining code blocks will be described in detail below in conjunction with FIG. 7, FIG. 8, and FIG. 9. Referring to FIG. 7 and FIG. 8, FIG. 8 is a schematic flow diagram for determining code blocks and reading code pages, and includes a first part 8*a* and a second part 8*b*. The first part 8*a* is a schematic flow diagram for determining code blocks, and the second part 8*b* is a schematic flow diagram for reading code pages. FIG. 9 is a portion of schematic flow diagram for determining a plurality of code blocks in FIG. 8, for example, determining sequentially in order of the address sequence from the first code block (Copy0) to the Pth code block (CopyP-1), wherein P is a positive integer greater than 1.

801 is performed to determine the arrangement of a plurality of memory dice and a plurality of memory planes in each memory die in the memory device. Referring to FIG. 7, memory die 0 (Die0) and memory plane 0 (Plane0) here are the first memory die and the first memory plane, respectively.

802 is performed to read all the memory planes in the plurality of memory dice simultaneously by using an async multi-plane independent reading operation, so as to obtain preset memory pages of all blocks in each memory plane. Each read operation only obtains a preset memory page in one block of each memory plane, and multiple reads are performed to obtain preset memory pages of all blocks in each memory plane.

It is noted that the above operations can also be performed by reading all the memory planes in multiple steps. For example, part of the memory planes may be read simultaneously first, and the remaining memory planes are read simultaneously after obtaining the preset memory pages of the plurality of blocks in the part of the memory planes, which will not be repeated here.

803 and 804 are performed to find whether there is a tag in the preset memory pages of all the obtained blocks, and when the tag is stored in the first block, it is determined that the first block is the code block.

805 is performed to determine whether the preset memory page obtained by the last read operation is the preset memory page in the last memory plane of the last memory die, if yes, the operation flow for determining the code blocks and the operation of the first part 8*a* ends, and if not, proceed to confirm the next or remaining part of the memory die and memory planes.

Next, after determining the plurality of code blocks in the plurality of memory planes, S601 is performed, that is, read a portion of code data of each code block of at least a portion of code blocks simultaneously by using an async multi-plane independent reading operation. The read code data in each of the code pages is different, and the read code data in the plurality of code pages constitutes a complete firmware code read. Specifically, referring to FIG. 8:

806 is performed to determine a start code page for the read operation in the plurality of code blocks according to the preset rules. In some specific examples, the start code page is generally Page0 of the code block.

807 is performed to read the plurality of code blocks one or more times by using an async multi-plane independent reading operation. During the first read operation, one code page of each code block of the plurality of code blocks can be read separately and simultaneously, and the plurality of code pages corresponding to the plurality of code blocks have different numbers. It is to be noted that when using an async multi-plane independent reading operation, one read operation can only read one code page in each code block, but one read operation can be performed on the plurality of code blocks simultaneously. Thus, the number of times of reading and the reading time for reading the plurality of code blocks can be saved, and the reading efficiency can be improved.

808 is performed to determine whether the code pages read in the first read operation includes the last code page; if yes, it means that the code data in the plurality of code pages are all read, and at this time, the read operation of the second part 8*b* ends; if not, it means that there are still unread code pages in the plurality of code pages (at this time, the number of code pages is greater than the number of code blocks), and then, a second read operation is performed, that is, read another code page of each of the plurality of code blocks separately and simultaneously; in other words, the numbers of the code pages read in the second read operation are not the same as the numbers of code pages read in the first read operation, and so on, until the code data of all code pages with different numbers are read, and the read operation of the second part 8*b* ends.

It should be noted that the number of code blocks in the memory device may be the same as or different from the number of code pages in each code block. When the number of code blocks is greater than or equal to the number of code pages, only one read operation is required to obtain the complete firmware code, and when the number of code blocks is less than the number of code pages, multiple read operations are required to obtain the complete firmware code. However, whether it is one or multiple read operations, the time taken is less than that of the related art where all code pages in a code block are read page by page. The specific reading mode of the read operation when the number of code blocks is the same as or different from the number of code pages in each code block will be described below.

In some examples, the number of the plurality of code blocks is M; each of the code blocks comprises N code pages; wherein the M and N are positive integers greater than 1; reading the portion of code data of each code block of at least a portion of code blocks simultaneously comprises: if M is equal to N, reading code data of one code page of each of the code blocks of the M code blocks simultaneously according to a preset rule; if M is greater than N, reading code data of one code page of each of the code blocks of N code blocks simultaneously according to a preset rule; if M is less than N, for the first to i-th times, reading the code data of one code page of each of the code blocks of the M code blocks simultaneously each time according to a preset rule; for the i+1-th time, reading code data of one code page of each of the code blocks of j code blocks simultaneously; wherein the i is an quotient of N divided by M, and the j is a remainder of N divided by M; and wherein, the code data read from each of the code pages is different.

Here, the M code blocks are encoded sequentially according to encoding rules in order from the first code block to the M-th code block; similarly, the encoding rules for the N code pages in each of the code blocks are to encode sequentially in order from the first to the N-th code page. The preset rule can be set for M and N correspondingly in numerical number order (such as the first code page of the first code block, the 2nd code page of the 2nd code block . . . ), or it can be set for M and N correspondingly in interval order (such as the 2nd code page of the first code block, the 4th code page of the 2nd code block . . . ), or it can be set for M and N correspondingly in non-regular numerical order (such as the 6th code page of the first code block, the first code page of the 2nd code block, the 4th code page of the 3rd code block . . . ). Alternatively, M and N can be set in any other suitable mapping relationship, which will not be repeated here. In the following examples, M and N are set correspondingly in numerical number order is illustrated as an example.

As shown in the example of FIG. 10, M=N=16, the first code page (Page0) in the first code block (Copy0), the 2nd code page (Page1) in the 2nd code block (Copy1), . . . , the 15th code page (Page14) in the 15th code block (Copy 14), and the 16th code page (Page15) in the 16th code block (Copy15) are read simultaneously by using an async multi-plane independent reading operation. Thus, the code data of 16 code pages can be obtained by one read operation performed on 16 code blocks, which can reduce the number of times of reading, shorten the reading time, and improve the reading performance.

As shown in the example of FIG. 11, M=16, N=13, the code data of one code page of each of 13 code blocks can be read by using an async multi-plane independent reading operation. For example, the first code page (Page0) in the first code block (Copy0), the 2nd code page (Page1) in the 2nd code block (Copy1), . . . , the 12th code page (Page11) in the 12th code block (Copy11), and the 13th code page (Page12) in the 13th code block (Copy12) are read simultaneously. Thus, the code data of 13 code pages can be obtained by one read operation performed on 13 code blocks, which can reduce the number of times of reading, shorten the reading time, and improve the reading performance.

It is noted that, when M is greater than N, the remaining M-N code blocks in the memory device do not need to be read, such as the 14th, 15th, and 16th code blocks (Copy 13-Copy 15) shown in FIG. 11. However, it should be understood that when the preset rule changes, whether the 14th, 15th, and 16th code blocks (Copy 13-Copy 15) will be read will also change accordingly, and details will not be repeated here.

When M is less than N, each code block needs to be read multiple times to obtain the complete firmware code; specifically: if M is less than N, for the first time, read the code data of one code page with a different number, from the first to the M-th code pages of each of the code blocks of the M code blocks simultaneously; for the k-th time, read the code data of one code page with a different number, from the (k−1)M+1-th to the kM-th code pages of each of the code blocks of the M code blocks simultaneously, wherein the k is an integer and 2≤k≤i; and, for the i+1-th time, read the code data of one code page with a different number, from the iM+1-th to the N-th code page of each of the code blocks of the j code blocks simultaneously.

Figure 12:
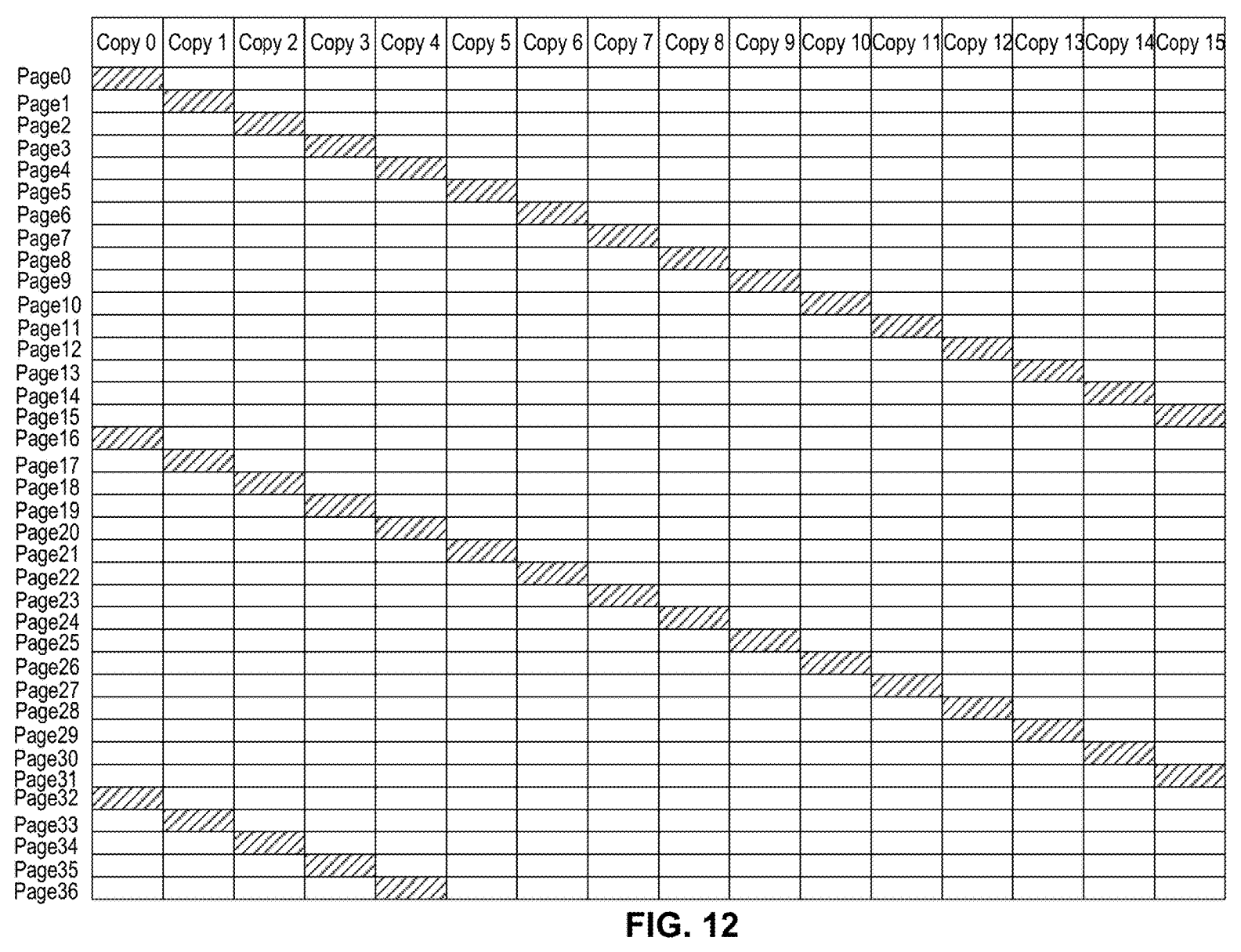

As shown in the example of FIG. 12, if M=16, N=37, then i=2, j=5, k=2 according to the calculation. Based on this, using the async multi-plane independent reading operation requires three read operations being performed on 16 code blocks.

For the first time, read the first code page (Page0) in the first code block, the 2nd code page (Page1) in the 2nd code block, . . . , the 15th code page (Page 14) in the 15th code block, and the 16th code page (Page15) in the 16th code block simultaneously.

For the second time, read the 17th code page (Page 16) in the first code block, the 18th code page (Page17) in the 2nd code block, . . . , the 31st code page (Page30) in the 15th code block, and the 32nd code page (Page31) in the 16th code block simultaneously.

For the third time, read the 33rd code page (Page32) in the first code block, the 34th code page (Page33) in the 2nd code block, and the 35th code page (Page34) in the 3rd code block, the 36th code page (Page35) in the 4th code block, and the 37th code page (Page36) in the 5th code block simultaneously. In this way, the code data of 37 code pages can be obtained by three read operations, thereby reducing the number of times of reading, shortening the reading time, and improving the reading performance.

In some examples, the operation method further comprises: after reading the portion of code data of each code block of at least a portion of code blocks simultaneously, combining the read portion of code data of each code block into complete code data stored in one code block according to a preset rule; and performing related operations after power-on or related operations of exiting a low power consumption mode using the complete code data.

According to one example, the read code data in the plurality of code pages (such as 16 code pages, 13 code pages, and 37 code pages) is sorted according to the sorting rules used when performing the read operation, and is combined into complete firmware code; after obtaining the complete firmware code, the loading or launching operation of the SSD is performed to facilitate the runnable environment arrangement for other programs.

It is noted that after reading the code data of the plurality of code pages, it may occur that the code data of one or more code pages is read incorrectly. Based on this, an example of the present disclosure discloses an operation method for error management with respect to erroneous code pages. As an example, after an erroneous code page occurs, a new code block is replaced that is different from the code block to which the erroneous code page belongs, and the code page with the same number as the erroneous code page in the new code block is reread. If the reread operation fails, the code block is replaced, and another reread operation is performed to ensure that the code data in the erroneous code page can be read correctly. If the code pages with the same number as the erroneous code page among all other code blocks cannot be read correctly, then the reread operation ends, that is, the entire read operation ends. In the examples of the present disclosure, the accuracy rate of a read operation can be improved by performing an error management operation on the erroneous code page, thereby improving the reading performance of the memory device.

The specific flow of the error management operation will be described in detail below with reference to FIG. 13.

In some examples, the operation method further comprises: after reading the portion of code data of each code block of at least a portion of code blocks simultaneously, checking whether the read portion of code data of each code block is correct.

As shown in the example of FIGS. 13, 1301 to 1307 are the same as 801 to 807, which have been mentioned above and will not be repeated here. Next, 1308 is performed to check and judge the read code data of the plurality of code pages to confirm whether the read code data of the code pages is erroneous; if erroneous, 1309 is performed to record the erroneous code page; if correct, proceed to 1310 to determine whether the read code page is the last code page, if yes, the read operation ends, and if not (at this time, the number of code pages is greater than the number of code blocks, and it is necessary to perform multiple read operations), return to 1307 to continue to perform the second read operation, and repeat until the code data of all the code pages is read.

In some examples, the operation method further comprises: when there is error in the read portion of code data of each code block, replacing the code block to which the erroneous code data belongs, and reading the replaced code block.

Figure 13:
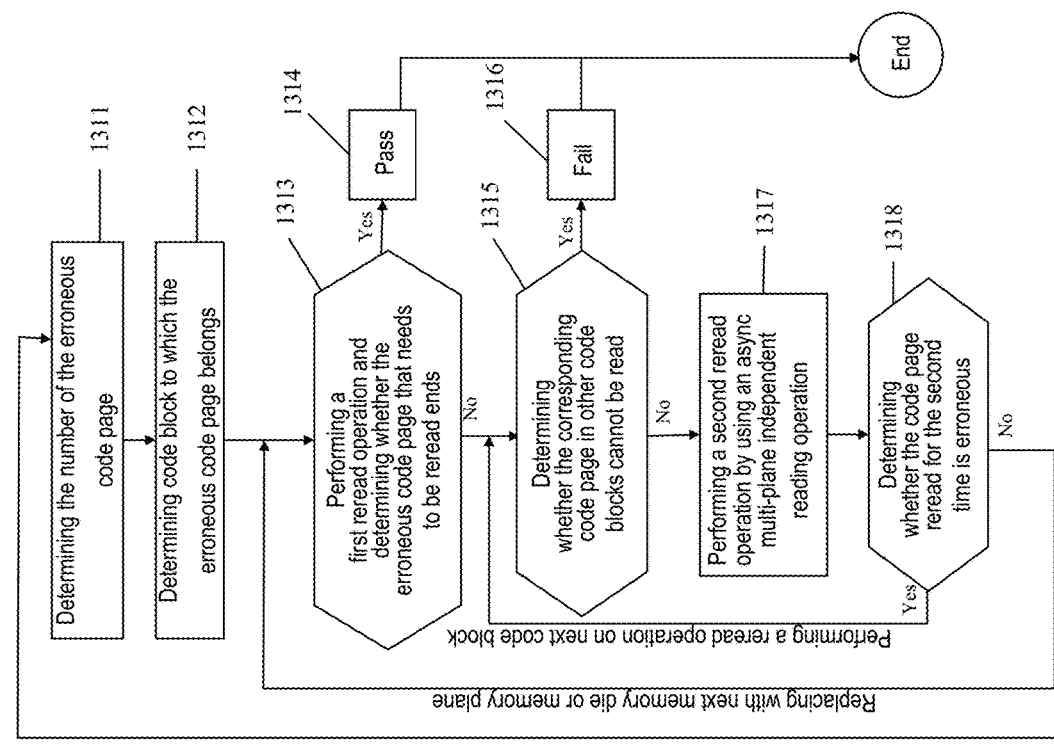
FIG. 13 is a schematic flow diagram of operations of error management provided by an example of the present disclosure.
Figure 13:
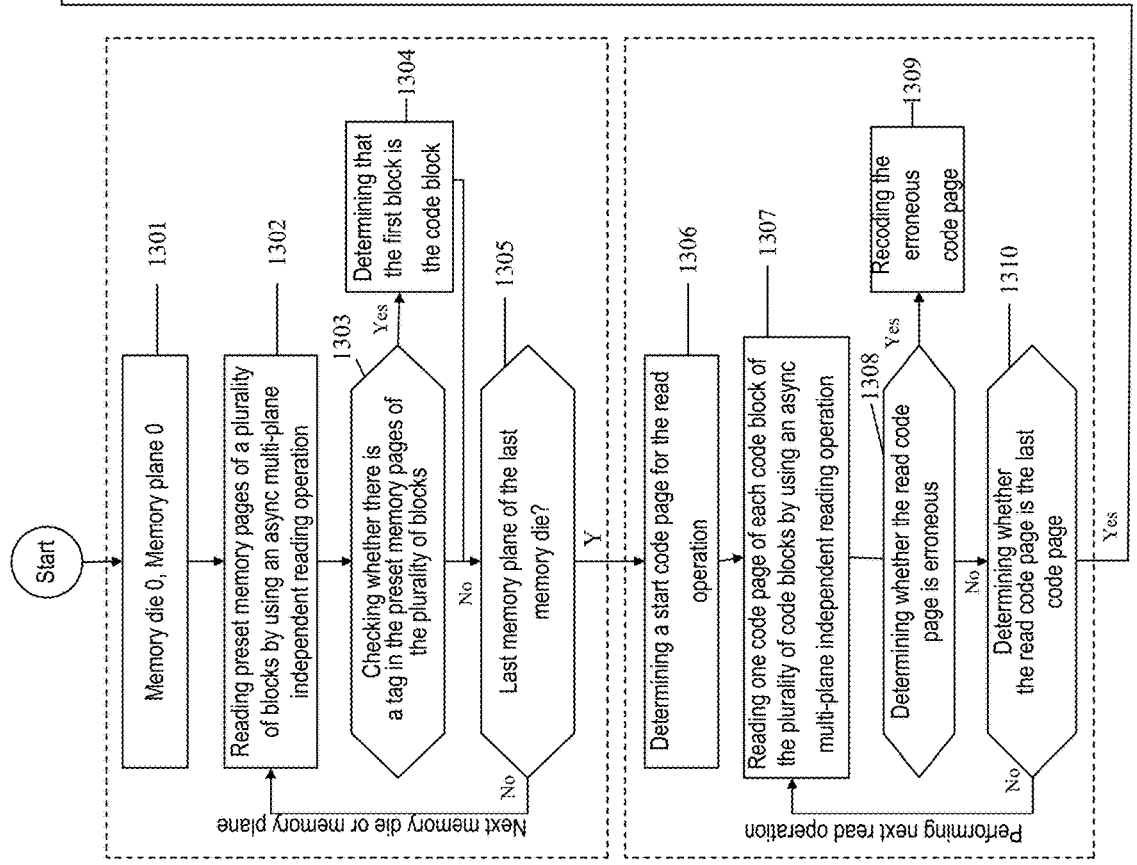

As shown in the example of FIGS. 13, 1311 and 1312 are performed according to one or more erroneous code pages recorded in 1309 to determine the number of the erroneous code page and the code block to which the erroneous code page belongs. Next, 1313 is performed to reselect a new code block and perform a first reread operation on the code page with the same number as the erroneous code page in the new code block, so as to read code data of the code page with the same number as the erroneous code page in the new code block. The new code block mentioned here may be a code block for which the operation of 1307 has been performed or may be a code block for which the aforementioned read operation has not been performed.

Next, based on 1313, it is determined whether the code data in the code page read by the first reread operation is correct. If the code data in the code page read by the first reread operation is correct, the reread operation for the erroneous code page ends. Next, 1314 is performed to determine whether the reread operation for the erroneous code page has been completed. If the corresponding code data in all erroneous code pages are read correctly, the reread operation is passed. That is, the error management operation ends. In other words, the entire read operation ends.

If the code data in the code page read by the first reread operation is erroneous, it means that the reread operation for the erroneous code page has not ended. Then 1315 is performed to determine whether the code pages with the same number of erroneous code page in other code blocks cannot be read correctly. If yes, 1316 is performed to determine that the first reread operation fails, and the error management operation ends. In other words, the entire read operation ends. If not, it means that the code data in the code page with the same number as the erroneous code page in other code blocks can be read correctly. Then, 1317 is performed to replace with a new code block again, and a second reread operation is performed on the replaced new code block by using the async multi-plane independent reading method. Here, the new code block replaced again can be one code block or a plurality of code blocks.

Next, based on the result of the second reread operation, 1318 is performed to determine whether the code data of the code page read by the second reread operation is erroneous; if not, it means that the data of the erroneous code page is read correctly, and 1313 is performed to perform the first reread operation on the next erroneous code page; if yes, it means that the data of the erroneous code page has not been read correctly, and 1315 is performed to continue to replace with a next code block and perform a third reread operation, repeat until the code data corresponding to the erroneous code page can be read correctly, and the error management operation ends.

Based on this, in the example of the present disclosure, different code pages in the plurality of code blocks in the plurality of different memory planes are read simultaneously by using an async multi-plane independent reading operation, and the read code data in all code pages constitutes the complete code data stored in one code block. In other words, the code data in the plurality of code pages can be read simultaneously one time by using the async multi-plane independent reading method. Thus, the number of times of reading and the reading time in the process of reading the complete firmware code can be reduced, thus the launching time of the memory system can be saved, and the reading performance of the memory system is improved.

Based on the above operation method of the memory system, an example of the present disclosure further provides a memory system, the memory system comprises: a memory device and a memory controller coupled to the memory device; wherein the memory device comprises at least one memory die, and the memory die comprises a plurality of code blocks storing code data; the code data stored in the plurality of code blocks is identical; the memory die comprises a plurality of memory planes, and the plurality of code blocks are stored in different memory planes; the memory controller is configured to: read a portion of code data of each code block of at least a portion of code blocks simultaneously by using an async multi-plane independent reading operation, wherein the read portion of code data of each code block constitutes complete code data stored in one code block.

In some examples, the number of the plurality of code blocks is M; each of the code blocks comprises N code pages; wherein the M and N are positive integers greater than 1; the memory controller is configured to: if M is equal to N, read code data of one code page of each of the code blocks of the M code blocks simultaneously according to a preset rule; if M is greater than N, read code data of one code page of each of the code blocks of N code blocks simultaneously according to a preset rule; and if M is less than N, for the first to the i-th times, read the code data of one code page of each of the code blocks of the M code blocks simultaneously each time according to a preset rule; for the i+1-th time, read code data of one code page of each of the code blocks of j code blocks simultaneously; wherein the i is an quotient of N divided by M, and the j is a remainder of N divided by M; and wherein, the code data read from each of the code pages is different.

In some examples, the encoding rules for the N code pages in each of the code blocks are to encode sequentially in order from the first to the N-th code page; the memory controller is configured to: if M is less than N, for the first time, read the code data of one code page with a different number, from the first to the M-th code pages of each of the code blocks of the M code blocks simultaneously; for the k-th time, read the code data of one code page with a different number, from the (k−1)M+1-th to the kM-th code pages of each of the code blocks of the M code blocks simultaneously, wherein the k is an integer and 2≤k≤i; and, for the i+1-th time, read the code data of one code page with a different number, from the iM+1-th to the N-th code page of each of the code blocks of the j code blocks simultaneously.

In some examples, the memory controller is configured to determine the plurality of code blocks from a plurality of blocks of the memory die before reading the portion of code data of each code block of at least a portion of code blocks simultaneously.

In some examples, the memory die comprises a plurality of memory planes, each of the memory planes comprises a plurality of blocks, each block of the plurality of blocks is provided with a preset memory page, one of the plurality of blocks is a code block, each code block comprises a plurality of code pages, and a tag used to characterize information of the code block is stored in preset memory pages of the plurality of code pages; the memory controller is configured to: read the preset memory pages of all the blocks in each of the memory planes of each of the memory die; and when the tag used to characterize the information of the code block is stored in a preset memory page of a first block, determine that the first block is the code block.

In some examples, the memory controller is configured to read the preset memory pages of all the blocks in each of the memory planes of each of the memory die by using an async multi-plane independent reading operation.

In some examples, the memory controller is configured to: after reading the portion of code data of each code block of at least a portion of code blocks simultaneously, combine the read portion of code data of each code block into complete code data stored in one code block according to a preset rule; and perform related operations after power-on or related operations of exiting a low power consumption mode using the complete code data.

In some examples, the memory controller is further configured to: after reading the portion of code data of each code block of at least a portion of code blocks simultaneously, check whether the read portion of code data of each code block is correct.

In some examples, the memory controller is further configured to: when there is error in the read portion of code data of each code block, replace the code block to which the erroneous code data belongs, and read the replaced code block.

In some examples, the memory system includes a universal flash storage (UFS) device or a solid state hard disk.

It should be understood that reference throughout the specification to "one example" or "an example" means that a particular feature, structure or characteristic related to the example is included in at least one example of the present disclosure. Thus, appearances of "in one example" or "in an example" in various places throughout the specification are not necessarily referring to the same example. Furthermore, these particular features, structures or characteristics may be combined in any suitable manner in one or more examples. It should be understood that in various examples of the present disclosure, the sequence numbers of the above-mentioned processes do not mean the order of execution, and the execution order of the processes should be determined by their functions and inherent logic, rather than limiting implementation process of the examples of the present disclosure. The serial numbers of the above-mentioned examples of the present disclosure are for description only, and do not represent the advantages and disadvantages of the examples.

The methods disclosed in the several method examples provided in the present disclosure can be combined arbitrarily to obtain new method examples if there is no conflict.

Based on this, on the one hand, an example of the present disclosure provides memory systems comprising: a memory device and a memory controller coupled to the memory device; wherein, the memory device comprises at least one memory die, and the memory die comprises a plurality of code blocks storing code data; the code data stored in the plurality of code blocks is identical; the memory die comprises a plurality of memory planes, and the plurality of code blocks are stored in different memory planes; the memory controller is configured to: read a portion of code data of each code block of at least a portion of code blocks simultaneously by using an async multi-plane independent reading operation, wherein the read portion of code data of each code block constitutes complete code data stored in one code block.

In the above example, the number of the plurality of code blocks is M; each of the code blocks comprises N code pages; wherein the M and N are positive integers greater than 1; the memory controller is configured to: if M is equal to N, read code data of one code page of each of the code blocks of the M code blocks simultaneously according to a preset rule; if M is greater than N, read code data of one code page of each of the code blocks of N code blocks simultaneously according to a preset rule; if M is less than N, for the first to the i-th times, read the code data of one code page of each of the code blocks of the M code blocks simultaneously each time according to a preset rule; for the i+1-th time, read code data of one code page of each of the code blocks of j code blocks simultaneously; wherein the i is an quotient of N divided by M, and the j is a remainder of N divided by M; and wherein, the code data read from each of the code pages is different.

In the above examples, the encoding rules for the N code pages in each of the code blocks are to encode sequentially in order from the first to the N-th code page; the memory controller is configured to: if M is less than N, for the first time, read the code data of one code page with a different number, from the first to the M-th code pages of each of the code blocks of the M code blocks simultaneously; for the k-th time, read the code data of one code page with a different number, from the (k−1)M+1-th to the kM-th code pages of each of the code blocks of the M code blocks simultaneously, wherein the k is an integer and 2≤k≤i; and, for the i+1-th time, read the code data of one code page with a different number, from the iM+1-th to the N-th code page of each of the code blocks of the j code blocks simultaneously.

In the above examples, the memory controller is configured to: determine the plurality of code blocks from a plurality of blocks of the memory die before reading the portion of code data of each code block of at least a portion of code blocks simultaneously.

In the above examples, the memory die comprises a plurality of memory planes, each of the memory planes comprises a plurality of blocks, each block of the plurality of blocks is provided with a preset memory page, one of the plurality of blocks is a code block, each code block comprises a plurality of code pages, and a tag used to characterize information of the code block is stored in preset memory pages of the plurality of code pages; the memory controller is configured to: read the preset memory pages of all the blocks in each of the memory planes of each of the memory die; and when the tag used to characterize the information of the code block is stored in a preset memory page of a first block, determine that the first block is the code block.

In the above examples, the memory controller is configured to: read the preset memory pages of all the blocks in each of the memory planes of each of the memory die by using an async multi-plane independent reading operation.

In the above examples, the memory controller is configured to: after reading the portion of code data of each code block of at least a portion of code blocks simultaneously, combine the read portion of code data of each code block into complete code data stored in one code block according to a preset rule; and perform related operations after power-on or related operations of exiting a low power consumption mode using the complete code data.

In the above examples, the memory controller is further configured to: after reading the portion of code data of each code block of at least a portion of code blocks simultaneously, check whether the read portion of code data of each code block is correct.

In the above examples, the memory controller is further configured to: when there is error in the read portion of code data of each code block, replace the code block to which the erroneous code data belongs, and read the replaced code block.

In the above examples, the memory system comprises a solid state disk.

On the other hand, an example of the present disclosure provides an operation method for a memory system, the memory system comprises: a memory device and a memory controller coupled to the memory device; wherein, the memory device comprises at least one memory die, and the memory die comprises a plurality of code blocks storing code data; the code data stored in the plurality of code blocks is identical; the memory die comprises a plurality of memory planes, and the plurality of code blocks are stored in different memory planes; the operation method comprises: reading a portion of code data of each code block of at least a portion of code blocks simultaneously by using an async multi-plane independent reading operation, wherein the read portion of code data of each code block constitutes complete code data stored in one code block.

In the above example, the number of the plurality of code blocks is M; each of the code blocks comprises N code pages; wherein the M and N are positive integers greater than 1; reading the portion of code data of each code block of at least a portion of code blocks simultaneously comprises: if M is equal to N, reading code data of one code page of each of the code blocks of the M code blocks simultaneously according to a preset rule; if M is greater than N, reading code data of one code page of each of the code blocks of N code blocks simultaneously according to a preset rule; if M is less than N, for the first to i-th times, reading the code data of one code page of each of the code blocks of the M code blocks simultaneously each time according to a preset rule; for the i+1-th time, reading code data of one code page of each of the code blocks of j code blocks simultaneously; wherein the i is an quotient of N divided by M, and the j is a remainder of N divided by M; and wherein, the code data read from each of the code pages is different.

In the above examples, the encoding rules for the N code pages in each of the code blocks are to encode sequentially in order from the first to the N-th code page; if M is less than N, for the first to i-th times, reading the code data of one code page of each of the code blocks of the M code blocks simultaneously each time according to the preset rule; for the i+1-th time, reading the code data of one code page of each of the code blocks of the j code blocks simultaneously comprises: if M is less than N, for the first time, reading the code data of one code page with a different number, from the first to the M-th code pages of each of the code blocks of the M code blocks simultaneously; for the k-th time, reading the code data of one code page with a different number, from the (k−1)M+1-th to the kM-th code pages of each of the code blocks of the M code blocks simultaneously, wherein the k is an integer and 2≤k≤i; and, for the i+1-th time, reading the code data of one code page with a different number, from the iM+1-th to the N-th code page of each of the code blocks of the j code blocks simultaneously.

In the above examples, the operation method further comprises: determining the plurality of code blocks from a plurality of blocks of the memory die before reading the portion of code data of each code block of at least a portion of code blocks simultaneously.

In the above examples, the memory die comprises a plurality of memory planes, each of the memory planes comprises a plurality of blocks, each block of the plurality of blocks is provided with a preset memory page, one of the plurality of blocks is a code block, each code block comprises a plurality of code pages, and a tag used to characterize information of the code block is stored in preset memory pages of the plurality of code pages; determining the plurality of code blocks from a plurality of blocks of the memory die comprises: reading the preset memory pages of all the blocks in each of the memory planes of each of the memory die; and when the tag used to characterize the information of the code block is stored in a preset memory page of a first block, determining that the first block is the code block.

In the above examples, the operation method further comprises: reading the preset memory pages of all the blocks in each of the memory planes of each of the memory die by using an async multi-plane independent reading operation.

In the above examples, the operation method further comprises: after reading the portion of code data of each code block of at least a portion of code blocks simultaneously, combining the read portion of code data of each code block into complete code data stored in one code block according to a preset rule; and performing related operations after power-on or related operations of exiting a low power consumption mode using the complete code data.

In the above examples, the operation method further comprises: after reading the portion of code data of each code block of at least a portion of code blocks simultaneously, checking whether the read portion of code data of each code block is correct.

In the above examples, the operation method further comprises: when there is error in the read portion of code data of each code block, replacing the code block to which the erroneous code data belongs, and reading the replaced code block.

In an example of the present disclosure, the memory system includes: a memory device and a memory controller coupled to the memory device; wherein, the memory device comprises at least one memory die, and the memory die comprises a plurality of code blocks storing code data; the code data stored in the plurality of code blocks is identical; the memory die comprises a plurality of memory planes, and the plurality of code blocks are stored in different memory planes; the memory controller is configured to: read a portion of code data of each code block of at least a portion of code blocks simultaneously by using an async multi-plane independent (AMPI) reading operation, wherein the read portion of code data of each code block constitutes complete code data stored in one code block. In other words, in the example of the present disclosure, different code pages in the plurality of code blocks in the plurality of different memory planes are read simultaneously by using the async multi-plane independent reading operation, and the read code data in all code pages constitutes the complete code data stored in one code block. Stated differently, the code data in the plurality of code pages can be read simultaneously by using async multi-plane independent reading. In this way, the number of times of reading and the reading time required in the process of reading complete code data can be reduced, thereby saving the launching time of the memory system and improving the reading performance of the memory system.

The forgoing description is only a specific implementation of the present disclosure, but the protection scope of the present disclosure is not limited thereto. Anyone skilled in the art can easily conceive of changes or substitutions within the technical scope of the present disclosure, which should fall within the protection scope of the present disclosure. Therefore, the protection scope of the present disclosure should be determined by the protection scope of the claims.

What is claimed is:

1. A memory system, comprising:
   a memory device including at least one memory die, and the memory die includes a plurality of code blocks, wherein a number of the plurality of code blocks is M and each of the code blocks includes N code pages, wherein M and N are positive integers greater than 1, and the plurality of code blocks store identical code data, and wherein the memory die includes a plurality of memory planes, and the plurality of code blocks are stored in different memory planes; and
   a memory controller coupled to the memory device, wherein the memory controller is configured to at least read a portion of code data of each code block of at least a portion of code blocks simultaneously by using an async multi-plane independent reading operation, wherein a read portion of code data of each code block constitutes complete code data stored in one code block, wherein to read the portion of code data of each code block further includes:
   if M is equal to N, read code data of one code page of each of the code blocks simultaneously according to a first preset rule;
   if M is greater than N, read code data of one code page of each of the code blocks of N code blocks simultaneously according to a second preset rule; and
   if M is less than N, for a first to an i-th times, read the code data of one code page of each of the code blocks simultaneously each time according to a third preset rule, and, for an i+1-th time, read code data of one code page of each of the code blocks of j code blocks simultaneously, wherein (i+1) is a quotient of N divided by M, and j is a remainder of N divided by M, wherein the code data read from each of the code pages is different.

2. The memory system according to claim 1, wherein encoding rules for the N code pages in each of the code blocks are to encode sequentially in order from a first to an N-th code page, and the memory controller is configured to:
   if M is less than N, for a first time, read the code data of one code page with a different number from a first to an M-th code pages of each of the code blocks simultaneously;
   for a k-th time, read the code data of one code page with a different number from a (k−1)M+1-th to a kM-th code pages of each of the code blocks simultaneously, wherein k is an integer and 2≤k≤i; and
   for the i+1-th time, read the code data of one code page with a different number from an iM+1-th to an N-th code pages of each of the code blocks of the j code blocks simultaneously.

3. The memory system according to claim 1, wherein the memory controller is configured to determine the plurality of code blocks from a plurality of blocks of the memory die before reading the portion of code data of each code block of at least the portion of code blocks simultaneously.

4. The memory system according to claim 3, wherein the memory die includes the plurality of memory planes, each of the memory planes includes the plurality of blocks, each block of the plurality of blocks is provided with a preset memory page, one of the plurality of blocks is a code block, each code block includes a plurality of code pages, and a tag used to characterize information of the code block is stored in preset memory pages of the plurality of code pages, and the memory controller is configured to:
   read the preset memory pages of all the blocks in each of the memory planes of each of the memory die; and
   when the tag used to characterize the information of the code block is stored in the preset memory page of a first block, determine that the first block is the code block.

5. The memory system according to claim 4, wherein the memory controller is configured to read the preset memory pages of all the blocks in each of the memory planes of each of the memory die by using the async multi-plane independent reading operation.

6. The memory system according to claim 1, wherein the memory controller is configured to:
   after reading the portion of code data of each code block of at least the portion of code blocks simultaneously, combine the read portion of code data of each code block into the complete code data stored in one code block according to a preset rule; and
   perform related operations after power-on or related operations of exiting a low power consumption mode using the complete code data.

7. The memory system according to claim 1, wherein the memory controller is further configured to, after reading the portion of code data of each code block of at least the portion of code blocks simultaneously, check whether the read portion of code data of each code block is correct.

8. The memory system according to claim 7, wherein the memory controller is further configured to, when there is error in the read portion of code data of each code block, replace the code block to which an erroneous code data belongs, and read the replaced code block.

9. The memory system according to claim 1, wherein the memory system includes a solid state disk.

10. An operation method for a memory system, wherein the memory system includes:
    a memory device, wherein the memory device includes at least one memory die with a plurality of code blocks storing identical code data, wherein a number of the plurality of code blocks is M and each of the code blocks includes N code pages, wherein M and N are positive integers greater than 1, and the memory die includes a plurality of memory planes, wherein the plurality of code blocks are stored in different memory planes; and a memory controller coupled to the memory device, and the operation method comprising:

reading a portion of code data of each code block of at least a portion of code blocks simultaneously by using an async multi-plane independent reading operation, wherein the read portion of code data of each code block constitutes complete code data stored in one code block, wherein reading the portion of code data of each code block of at least the portion of code blocks simultaneously includes:

if M is equal to N, reading code data of one code page of each of the code blocks simultaneously according to a first preset rule;

if M is greater than N, reading code data of one code page of each of the code blocks of N code blocks simultaneously according to a second preset rule; and if M is less than N, for a first to an i-th times, reading the code data of one code page of each of the code blocks simultaneously each time according to a third preset rule, and, for an i+1-th time, reading code data of one code page of each of the code blocks of j code blocks simultaneously, wherein i+1 is a quotient of N divided by M, and j is a remainder of N divided by M, wherein the code data read from each of the code pages is different; and determining the plurality of code blocks from a plurality of blocks of the memory die before reading the portion of code data of each code block of at least the portion of code blocks simultaneously.

11. The operation method according to claim 10, wherein encoding rules for the N code pages in each of the code blocks are to encode sequentially in order from a first to an N-th code page, and if M is less than N, for the first to i-th times, reading the code data of one code page of each of the code blocks simultaneously each time according to the third preset rule, and, for the i+1-th time, reading the code data of one code page of each of the code blocks of the j code blocks simultaneously includes:

if M is less than N, for a first time, reading the code data of one code page with a different number from a first to an M-th code pages of each of the code blocks simultaneously;

for a k-th time, reading the code data of one code page with a different number from a (k−1)M+1-th to a kM-th code pages of each of the code blocks simultaneously, wherein k is an integer and 2≤k≤i; and for the i+1-th time, reading the code data of one code page with a different number from an iM+1-th to an N-th code page of each of the code blocks of the j code blocks simultaneously.

12. The operation method according to claim 10, wherein the memory die includes the plurality of memory planes, each of the memory planes includes the plurality of blocks, each block of the plurality of blocks is provided with a preset memory page, one of the plurality of blocks is a code block, each code block includes a plurality of code pages, and a tag used to characterize information of the code block is stored in preset memory pages of the plurality of code pages, and determining the plurality of code blocks from the plurality of blocks of the memory die includes:

reading the preset memory pages of all the blocks in each of the memory planes of each of the memory die; and when the tag used to characterize the information of the code block is stored in the preset memory page of a first block, determining that the first block is the code block.

13. The operation method according to claim 12, wherein reading the preset memory pages of all the blocks in each of the memory planes of each of the memory die includes reading the preset memory pages of all the blocks in each of the memory planes of each of the memory die by using the async multi-plane independent reading operation.

14. The operation method according to claim 10, wherein the operation method further includes:

after reading the portion of code data of each code block of at least the portion of code blocks simultaneously, combining the read portion of code data of each code block into the complete code data stored in one code block according to a preset rule; and performing related operations after power-on or related operations of exiting a low power consumption mode using the complete code data.

15. The operation method according to claim 10, wherein the operation method further includes, after reading the portion of code data of each code block of at least the portion of code blocks simultaneously, checking whether the read portion of code data of each code block is correct.

16. The operation method according to claim 15, wherein the operation method further includes, when there is error in the read portion of code data of each code block, replacing the code block to which an erroneous code data belongs, and reading the replaced code block.

17. The operation method according to claim 10, wherein the memory system includes a solid state disk.

18. An apparatus comprising a memory controller configured to at least:

read a portion of code data of each code block of at least a portion of code blocks of a plurality of code blocks of a memory device, wherein a number of the plurality of code blocks is M and each of the code blocks includes N code pages, wherein M and N are positive integers greater than 1, and the plurality of code blocks store identical code data, and wherein the memory device includes a memory die with a plurality of memory planes, and the plurality of code blocks are stored in different memory planes simultaneously by using an async multi-plane independent reading operation, wherein a read portion of code data of each code block constitutes complete code data stored in one code block, wherein to read the portion of code data of each code block further includes:

if M is equal to N, read code data of one code page of each of the code blocks simultaneously according to a first preset rule;

if M is greater than N, read code data of one code page of each of the code blocks of N code blocks simultaneously according to a second preset rule; and if M is less than N, for a first to an i-th times, read the code data of one code page of each of the code blocks simultaneously each time according to a third preset rule, and, for an i+1-th time, read code data of one code page of each of the code blocks of j code blocks simultaneously, wherein (i+1) is a quotient of N divided by M, and j is a remainder of N divided by M, wherein the code data read from each of the code pages is different.

19. The apparatus according to claim 18, wherein encoding rules for the N code pages in each of the code blocks are to encode sequentially in order from a first to an N-th code page, and the memory controller is configured to:

if M is less than N, for a first time, read the code data of one code page with a different number from a first to an M-th code pages of each of the code blocks simultaneously;

for a k-th time, read the code data of one code page with a different number from a (k−1)M+1-th to a kM-th code pages of each of the code blocks simultaneously, wherein k is an integer and 2≤k≤i; and for the i+1-th time, read the code data of one code page with a different number from an iM+1-th to an N-th code page of each of the code blocks of the j code blocks simultaneously.

20. The apparatus according to claim 18, wherein the memory controller is configured to determine the plurality of code blocks from a plurality of blocks of the memory die before reading the portion of code data of each code block of at least the portion of code blocks simultaneously.

* * * * *